(12) United States Patent
Wu (10) Patent No.: US 12,533,262 B2
(45) Date of Patent: Jan. 27, 2026

(54) AUTO-DARKENING WELDING HELMET AND WELDING APPARATUS EQUIPPED WITH THE SAME

(71) Applicant: TECMEN ELECTRONICS CO., LTD, Jiangsu (CN)

(72) Inventor: Ziying Wu, Nanjing (CN)

(73) Assignee: TECMEN ELECTRONICS CO., LTD, Nanjing (CN)

(*) Notice: Subject to any disclaimer, the term of this patent is extended or adjusted under 35 U.S.C. 154(b) by 802 days.

(21) Appl. No.: 17/250,615

(22) PCT Filed: Nov. 29, 2018

(86) PCT No.: PCT/CN2018/118064
§ 371 (c)(1),
(2) Date: Feb. 10, 2021

(87) PCT Pub. No.: WO2020/034488
PCT Pub. Date: Feb. 20, 2020

(65) Prior Publication Data
US 2021/0161717 A1    Jun. 3, 2021

(30) Foreign Application Priority Data
Aug. 15, 2018  (CN) .......................... 201821311377.9

(51) Int. Cl.
*B23K 9/32*      (2006.01)
*A61F 9/06*      (2006.01)
(52) U.S. Cl.
CPC .............. *A61F 9/067* (2013.01); *B23K 9/322* (2013.01)

(58) Field of Classification Search
CPC .. B23K 9/322; A61F 9/06; A61F 9/067; F16P 1/06
See application file for complete search history.

(56) References Cited

U.S. PATENT DOCUMENTS 6,242,711 B1     6/2001 Cooper
2005/0001155 A1*  1/2005 Fergason ................. B23K 9/32
                                                                        250/221

(Continued)

FOREIGN PATENT DOCUMENTS

CN      204971843 U     1/2016
CN      105451923 A     3/2016
(Continued)

OTHER PUBLICATIONS

Wu CN-105769437-A english translation (Year: 2016).*
(Continued)

*Primary Examiner* — Tiffany T Tran (57) ABSTRACT

The present application relates to a welding apparatus and an auto-darkening welding helmet (1) therefor. The auto-darkening welding helmet (1) comprises a helmet casing (10); an auto-darkening filter (20) secured on the helmet casing (10); a wireless communication module (100b) and a control circuit (700) which are installed on and/in the helmet casing (10), wherein the wireless communication module (100b) is able to be in wireless data communication with an external apparatus, and based on data received from the external apparatus, the control circuit (700) is able to set an operating parameter of the auto-darkening filter and/or a prompt message, and wherein the auto-darkening filter (20) is able to be operated independently of the external apparatus.

20 Claims, 4 Drawing Sheets

(56) References Cited

U.S. PATENT DOCUMENTS

| | | | |
|---|---|---|---|
| 2007/0081250 A1* | 4/2007 | Garbergs | A61F 9/061 |
| | | | 359/601 |
| 2011/0156989 A1* | 6/2011 | Huh | A61F 9/067 |
| | | | 340/636.15 |
| 2014/0051358 A1* | 2/2014 | Dina | B23K 9/322 |
| | | | 455/41.2 |
| 2014/0346158 A1 | 11/2014 | Matthews | |
| 2016/0163221 A1* | 6/2016 | Sommers | B23K 9/0956 |
| | | | 434/234 |
| 2016/0288236 A1* | 10/2016 | Becker | B23K 9/0953 |
| 2016/0318114 A1 | 11/2016 | Kowaleski | |
| 2017/0021444 A1* | 1/2017 | Simioni | B23K 9/322 |
| 2017/0173720 A1 | 6/2017 | Sumner | |
| 2017/0290707 A1* | 10/2017 | Wu | A61F 9/067 |
| 2017/0326674 A1* | 11/2017 | Dunbar | A61F 9/06 |
| 2017/0372216 A1* | 12/2017 | Awiszus | A61F 11/06 |
| 2019/0143437 A1* | 5/2019 | Hofer Kraner | G02F 1/13318 |
| | | | 219/130.01 |

FOREIGN PATENT DOCUMENTS

| | | | | |
|---|---|---|---|---|
| CN | 105769437 A | * | 7/2016 | |
| CN | 105982785 A | * | 10/2016 | A61F 9/06 |
| CN | 107427389 A | | 12/2017 | |
| CN | 109730831 A | | 5/2019 | |
| EP | 3185068 A1 | | 6/2017 | |
| EP | 3228287 A1 | | 10/2017 | |
| EP | 3335823 A1 | | 6/2018 | |
| GB | 2528575 A | * | 1/2016 | A61F 9/06 |
| WO | 2015151050 A1 | | 10/2015 | |
| WO | 2016089545 A1 | | 6/2016 | |
| WO | WO-2017041887 A1 | * | 3/2017 | |
| WO | 2017223451 A1 | | 12/2017 | |

OTHER PUBLICATIONS

WO-2017041887-A1-English-Translation (2017) (Year: 2017).*
Extended European Search Report issued Aug. 16, 2022 regarding Application No. 18930127.8, 20 pages.
Partial Supplementary European Search Report issued Apr. 22, 2022 regarding Application No. 18930127.8, 18 pages.
International Search Report and Written Opinion regarding International Application No. PCT/CN2018/118064, issued May 24, 2019, 9 pages.

* cited by examiner

AUTO-DARKENING WELDING HELMET AND WELDING APPARATUS EQUIPPED WITH THE SAME

CROSS-REFERENCE TO RELATED APPLICATIONS

This application is a 371 National Stage of International Application No. PCT/CN2018/118064 filed Nov. 29, 2018, which claims priority to Chinese Patent Application No. CN201821311377.9 filed Aug. 15, 2018, the disclosures of which are herein incorporated by reference in their entirety.

BACKGROUND

1. Field

The present application generally relates to an auto-darkening welding helmet and a welding apparatus equipped with the auto-darkening welding helmet.

2. Description of Related Art

In a welding operation, an operator usually wears a welding helmet on his/her head to prevent him/her from being hurt by spattering matters and various harmful rays caused by welding-arc ignition. In a conventional welding helmet, a light filter is a key component to protect eyes of the operator from the harmful rays. The conventional welding helmet requires that the operator has to observe a location where the welding-arc ignition will occur before the welding helmet is worn on his/her head in place, and then carries out a blind welding operation after the welding helmet is in place. Such a blind welding operation may result in much inconvenience on welding sites.

To this end, auto-darkening welding helmets have been developed in recent years. An auto-darkening welding helmet is generally provided with an auto-darkening filter. The main working principle of the auto-darkening filter is in that the filter is provided with a liquid crystal panel which is in a transparent state prior to the welding-arc ignition and becomes in an opaque state immediately after the welding-arc ignition so as to protect the eyes of the operator.

Usually, the auto-darkening welding helmet is provided with an adjusting knob or button such that before the welding helmet is used, the operator shall preset operating parameters of the auto-darkening filter such as such as SENSITIVITY, DELAY TIME, SHADE, and WELD MODE or the like from his/her experiences depending on set operating parameters of a relevant electric welder. Afterwards, the operator will wear the welding helmet on his/her head to carry out a test welding operation. If the operator feels his/her eyes uncomfortable during the test welding operation with the preset auto-darkening filter, the welding helmet has to be taken off to set the operating parameters of the auto-darkening filer from experiences again, which results in much inconvenience on welding sites.

SUMMARY

The present application is aimed at proposing an improved auto-darkening welding helmet such that before it is worn by an operator, its operating parameters can be automatically reasonably set depending on operating parameters of a relevant electric welder. Afterwards, the operator can directly wear the welding helmet on his/her head to conveniently carry out a welding operation. Therefore, a test welding operation as mentioned previously will be avoided.

According to one aspect, the present application provides an auto-darkening welding helmet, comprising:
 a helmet casing;
 an auto-darkening filter secured on the helmet casing;
 a wireless communication module installed in the helmet casing and configured to wirelessly communicate data to and from an external apparatus, and
 a control circuit installed on the helmet casing and configured to set at least one of an operating parameter of the auto-darkening filter or a prompt message based on data received from the external apparatus,
 wherein the auto-darkening filter is configured to be operated independently of the external apparatus.

Optionally, the auto-darkening welding helmet further comprises a display screen including a LCD or LED display and configured to exhibit or adjust the set operating parameter.

Optionally, the external apparatus is an electric welder, data received from the electric welder depends on an operating parameter of the electric welder, and the operating parameter of the electric welder comprises at least one of a welding current, welding type, welding material type, or soldering wire size.

Optionally, the auto-darkening welding helmet further comprises a sensor installed on either the helmet casing or the auto-darkening filter and configured to collect data including at least one of an ambient temperature, humidity, noise, or air quality,
 wherein the wireless communication module is configured to transfer collected data to the external apparatus.

Optionally, the wireless communication module comprises a WIFI module, a Bluetooth module, an infrared communication module, a ZigBee module, an 802.15.4 protocol based module, a wireless HART module, or a Z-wave module.

Optionally, the operating parameter of the auto-darkening filter comprises SHADE, SENSITIVITY, DELAY TIME, and WELD MODE.

Optionally, the prompt message includes at least one of a long working alarm of an operator or a poor working environment alarm of the operator.

According to another aspect, the present application provides a welding apparatus, comprising:
 an electric welder including a first wireless communication module;
 a welding torch connected to the electric welder via a cable;
 a gas cylinder connected to the electric welder via a pipeline; and
 an auto-darkening welding helmet comprising:
  a helmet casing,
  an auto-darkening filter secured on the helmet casing,
  a second wireless communication module installed in the helmet casing and configured to wirelessly communicate with the electric welder, and
  a control circuit installed on the helmet casing and configured to set an operating parameter of at least one of the auto-darkening filter or a prompt message based on data received from the electric welder,
  wherein the second wireless communication module is configured to wirelessly communicate data to and from the first wireless communication module.

Optionally, the welding apparatus comprises a memory unit including a relational database that stores correspondences between operating parameters of the electric welder and the auto-darkening filter.

Optionally, the welding apparatus is configured to send data, based on currently set operating parameters of the electric welder, to the auto-darkening welding helmet, and
the auto-darkening filter is configured to according to the relational database automatically set the operating parameters based on the received data from the electric welder.

Optionally, the first wireless communication module is configured to be coupled to a cloud server over a wireless network, and the first wireless communication module is configured to update the relational database by using the wireless network.

Optionally, the relational database is established based on previous uses of at least one of the auto-darkening welding helmet or the electric welder.

Optionally, the first wireless communication module is coupled to a cloud server over a wireless network and configured to at least one of (i) upload ambient data and the operating parameters from the second wireless communication module to the cloud server or (ii) transfer data from the cloud server to the second wireless communication module.

Optionally, the welding apparatus is configured to transfer a prompt message from the cloud server to the auto-darkening welding helmet,
based on the prompt message, the auto-darkening filter is configured to display an alarm by exhibition on at least one of a display screen of the auto-darkening filter, a sound, or a vibration, wherein the display screen comprises a LCD or LED display.

According to another aspect, the present application provides an auto-darkening welding helmet, comprising:
a helmet casing;
an auto-darkening filter secured on the helmet casing; and
a wireless communication module and a control circuit which are installed on and/in the helmet casing, wherein the wireless communication module is able to be in wireless data communication with an external apparatus, and based on data received from the external apparatus, the control circuit is able to set an operating parameter of the auto-darkening filter and/or a prompt message, and wherein the auto-darkening filter is able to be operated independently of the external apparatus.

Optionally, the auto-darkening welding helmet also comprises a LCD/LED display screen on which the set operating parameter is able to be exhibited or adjusted.

Optionally, the external apparatus is an electric welding helmet, data received from the electric welding helmet depends on an operating parameter of the electric welding helmet, and the operating parameter of the electric helmet comprises welding current, welding type, welding material type, soldering wire size or the like.

Optionally, installed on the helmet casing and/or the auto-darkening filter is a sensor to collect data such as ambient temperature, humidity, noise, air quality or the like, and the collected data are able to be transferred to the external apparatus via the wireless communication module.

Optionally, the wireless communication module comprises a WIFI module, a Bluetooth module, an infrared communication module, a ZigBee module, an 802.15.4 protocol based module, a wireless HART module, a Z-wave modules or any other suitable low power wireless communication module.

Optionally, the settable operating parameter of the auto-darkening filter comprises SHADE, SENSITIVITY, DELAY TIME, and WELD MODE.

Optionally, the prompt message includes a long working alarm of an operator, a poor working environment alarm of the operator or the like.

According to another aspect, the present application provides a welding apparatus, comprising:
an electric welder provided with a wireless communication module;
a welding torch connected to the electric welder via a cable;
a gas cylinder connected to the electric welder via a pipeline; and
an auto-darkening welding helmet as mentioned above, wherein a wireless communication module of the auto-darkening welding helmet is in wireless data communication with the wireless communication module of the electric welder.

Optionally, the welding apparatus is provided with a memory unit in which a relational database including the correspondences between operating parameters of the electric welder and an auto-darkening filter of the auto-darkening welding helmet are stored.

Optionally, depending on the relational database, the welding apparatus sends data based on currently set operating parameters of the electric welder to the auto-darkening welding helmet such that the operating parameters of the auto-darkening filter are able to be automatically set based on the received data.

Optionally, the wireless communication module of the electric welder is able to be coupled to a cloud server over a wireless network such that the relational database is able to be updated.

Optionally, the relational database is established on the basis of experiences of operators who use the auto-darkening welding helmet and/or the electric welder.

Optionally, the wireless communication module of the welding apparatus is able to be coupled to a cloud server over a wireless network, and is able to upload ambient data and the operating parameters from the wireless communication module of the auto-darkening welding helmet to the cloud server and/or transfer data from the cloud server to the wireless communication module of the auto-darkening welding helmet.

Optionally, the welding apparatus transfers a prompt message provided by the cloud server to the auto-darkening welding helmet such that the auto-darkening filter is able to give an alarm by exhibition on its LCD/LED display screen, and/or sound and/or vibration.

According to the technical means of the present application, preparation time at the welding site is saved, and thus work efficiency is improved. In the meanwhile, user management of the welding helmet and apparatus management of the electric welder are integrated into the category of cloud management to improve enterprise management efficiency.

BRIEF DESCRIPTION OF THE DRAWINGS

The foregoing and other aspects of the present application will be fully understood from the following detailed explanations in combination with the attached drawings. It should be noted that although the drawings are given in different proportions for clarity purposes, they should not be deemed to affect understanding to the present application. In the drawings.

DETAILED DESCRIPTION

In the drawings of the present application, features having the same configure or a similar function may be represented by the same reference numerals.

Figure 1:
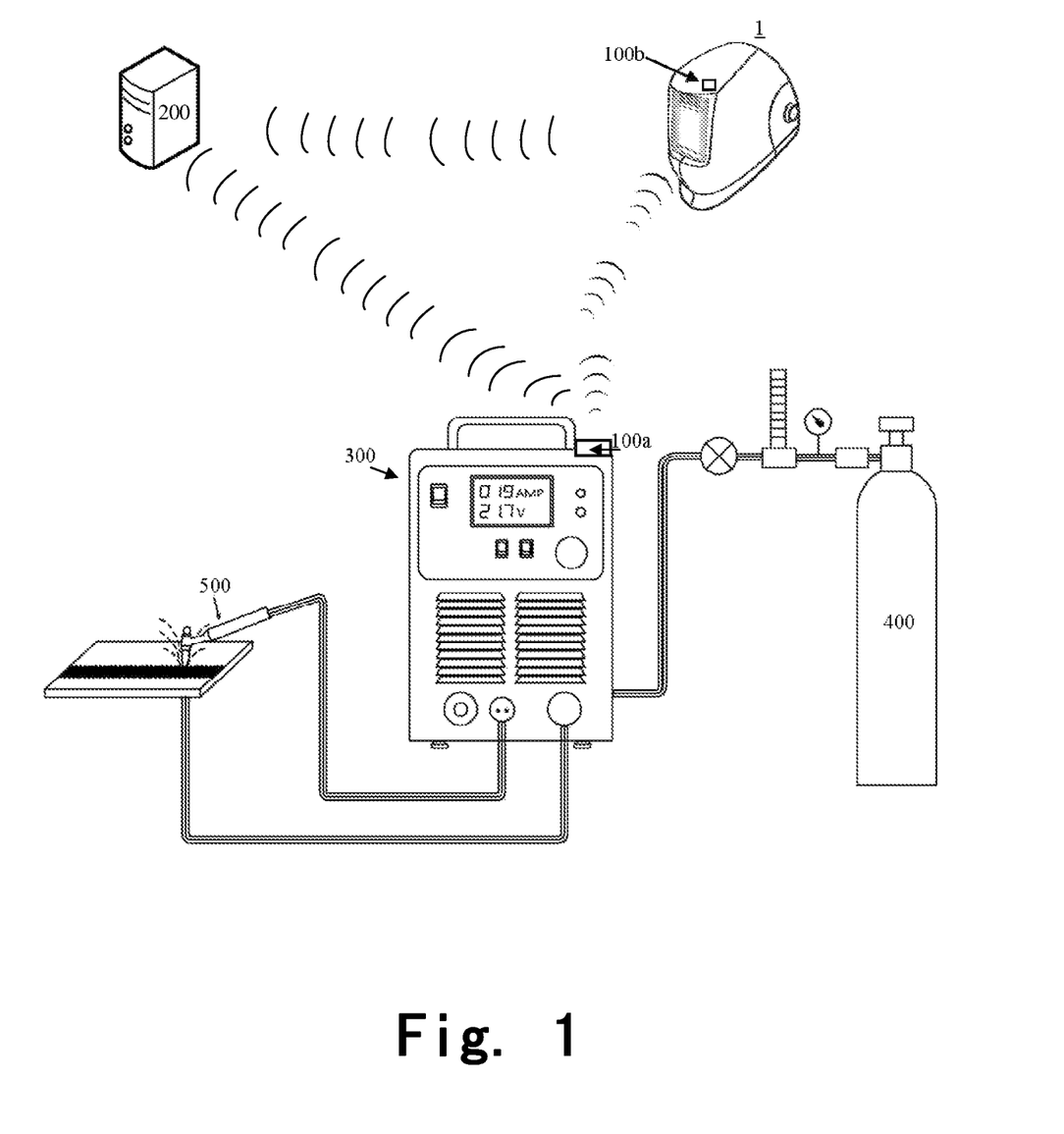
FIG. 1 schematically illustrates a welding apparatus according to the present application, which is equipped with an auto-darkening welding helmet according to an embodiment of the present application and is able to be coupled to a cloud server over a wireless network.
Figure 3:
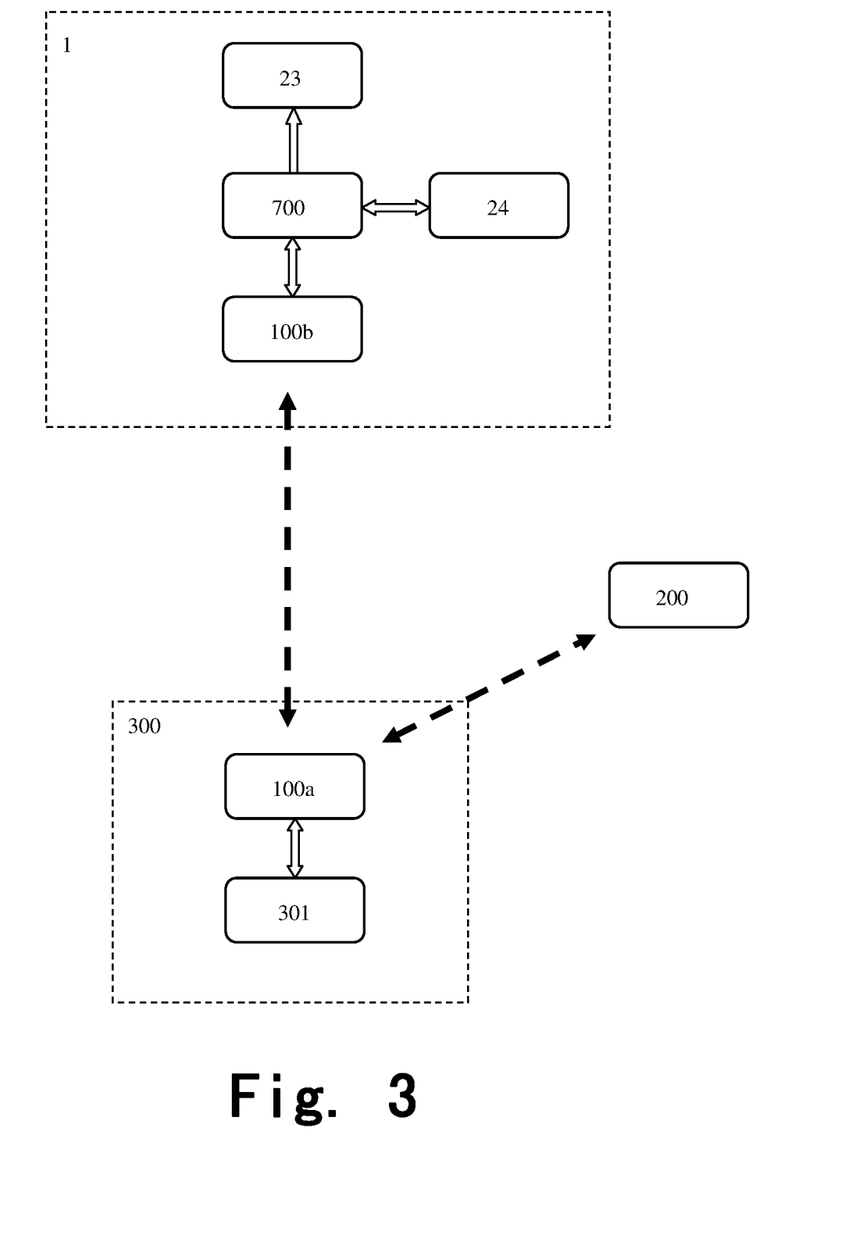
FIG. 3 schematically illustrates a control block diagram for the auto-darkening welding helmet according to the present application.

FIG. 1 schematically illustrates one embodiment of a welding apparatus according to the present application. The welding apparatus comprises an electric welder 300, a gas cylinder 400 (for example an argon gas cylinder), and a welding torch 500. The electric welder 300, the gas cylinder 400 and the welding torch 500 are connected to each other by cables or pipelines in a manner known in the art. Besides, the welding apparatus also comprises a wireless communication module 100a for example disposed on the electric welder 300. The wireless communication module 100a is connected to an interior electric circuit 301 (as shown by FIG. 3) of the electric welder 300 to transfer operating parameters of the electric welder such as welding current, welding type, welding material type, soldering wire size or the like, and a prompt message.

It should be understood that the wireless communication module 100a is not limited to be provided at a location in the electric welder 300 as shown by FIG. 1. Rather, for example, the wireless communication module can be hiddenly in-built in a housing of the electric welder 300.

Figure 2A:
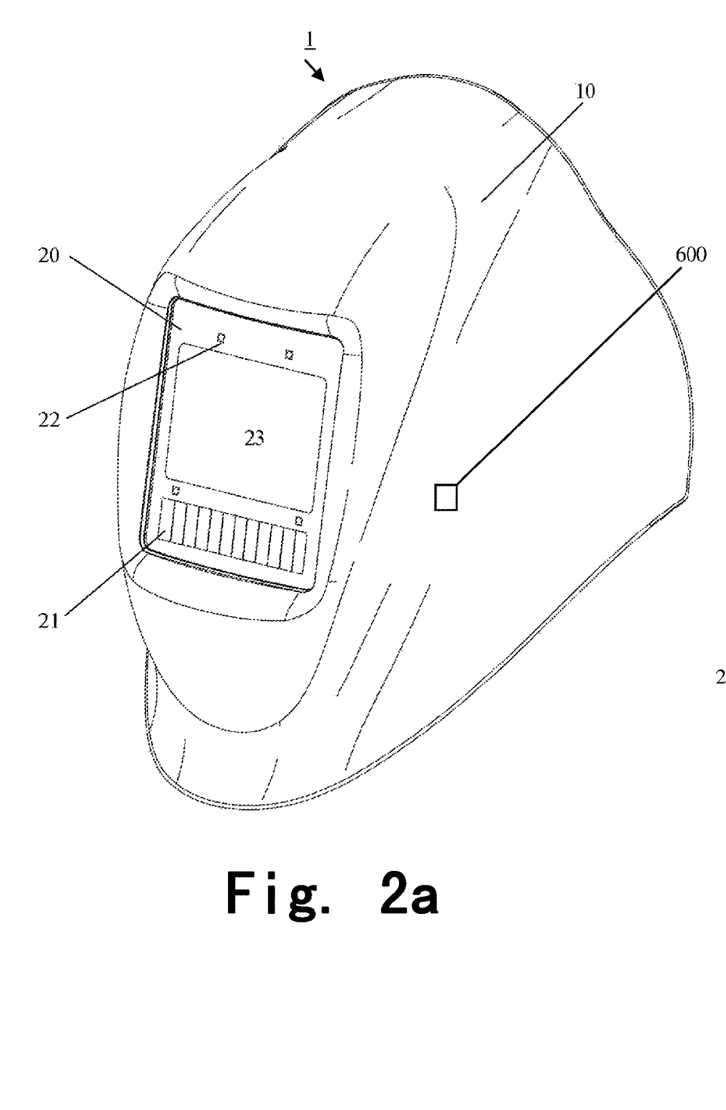
FIGS. 2A and 2B are perspective views schematically illustrating the auto-darkening welding helmet according to an embodiment of the present application.
Figure 2B:
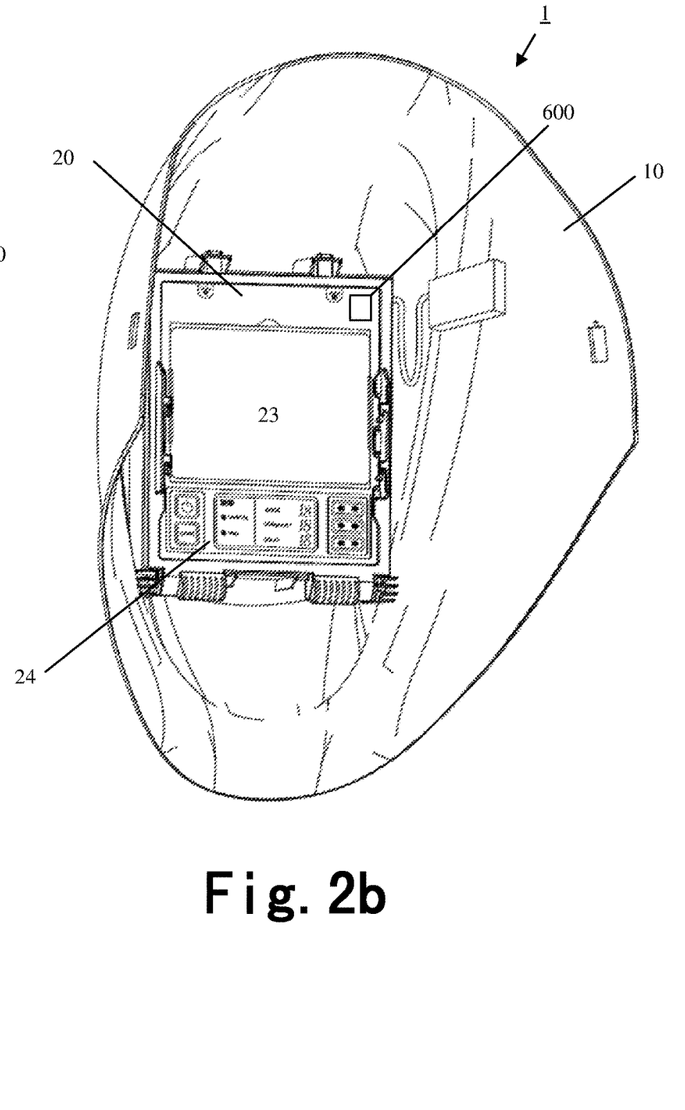

FIGS. 2A and 2B are perspective views schematically illustrating an auto-darkening welding helmet 1 according to an embodiment of the present application. The welding helmet 1 comprises a helmet casing 10, an auto-darkening filter 20 installed on the helmet casing 10, and a headband structure (not shown) operatively coupled to the helmet casing 10.

For clarity, in the context of the present application, it is specified that the term "front face" or "front side" refers to a face or side towards outside and departing from the face of an operator when the welding helmet has been worn on his/her head; and the term "back face" or "back side" refers to a face of side towards inside and to the face of the operator when the welding helmet has been worn on his/her head.

As illustrated, a solar cell unit module 21, a light-control module 22, a liquid crystal panel 23 and a display screen 24 are integrated in a body of the auto-darkening filter 20. The display screen 24 can be used to exhibit various operating parameters of the liquid crystal panel 23 such as SENSITIVITY, DELAY TIME, SHADE, and WELD MODE or the like. The display screen 24 can be a display screen including a LCD or LED display. Moreover, a battery can be installed on an interior surface of the helmet casing 10, by which battery the auto-darkening filter 20, the display screen 24 or their control circuit can be power-supplied via electrical cables. It should be understood that the battery can be a rechargeable battery.

The solar cell unit module 21 and the light-control module 22 are located on a front face of the body, and the LCD or LED display screen 24 is located on a back face of the body, such that the operator can easily observe how the various operating parameters of the auto-darkening filter 20 are set before the welding helmet 1 is worn on his/her head.

The display screen 24 can be used to exhibit the operating parameters of the auto-darkening filter 20 such as SHADE, SENSITIVITY, DELAY, operating modes such as WELD, CUTTING and GRIND or the like; or battery remaining capacity. The display screen 24 itself can be a touchable display screen on which virtual touch keys can be provided such that the operating parameters of the auto-darkening filter 20 can be manually adjusted. In an optional or alternative embodiment, the display screen 24 can be replaced by a non-touchable display screen which is provided with physical touch keys to adjust the parameters.

As shown by FIG. 1, the welding helmet 1 is also provided with a wireless communication module 100b. For instance, the wireless communication module 100b is disposed on the helmet casing 10 above the auto-darkening filter 20. It should be understood by one ordinary person in the art that as an alternative, the wireless communication module 100b can be disposed at any location of the helmet casing 10 where signal emission or reception cannot be affected, for example can be hiddenly in-built in the helmet casing 10.

The wireless communication module 100b can be connected to a control circuit 700 of the welding helmet 1, as shown by FIG. 3, such that the control circuit can transfer information to the wireless communication module 100a or receive information from the wireless communication module 100a via the wireless communication module 100b. The wireless communication modules 100a and 100b can be Wireless Fidelity (WIFI) modules, Bluetooth modules, infrared communication modules, ZigBee modules, 802.15.4 protocol based modules, wireless HART modules, Z-wave modules or other suitable low power wireless communication modules.

FIG. 3 schematically illustrates a control block diagram for the auto-darkening welding helmet 1 according to the present application. The control circuit 700 comprises a central processing unit, a memory unit and a sensor collector. Preset processing programs are saved in the memory unit such that the central processing unit can handle received data depending on the programs. The battery is connected to the liquid crystal panel 23 and the display screen 24 through the control circuit 700 of the welding helmet 1. Besides, the control circuit 700 is connected to the wireless communication module 100b. In this way, due to data exchange between the wireless communication modules 100a and 100b, the control circuit 700 of the welding helmet 1 can handle data received from the wireless communication module 100a, for example the electric welder 300's operating parameters such as welding currents, welding types, welding material types, soldering wire sizes or the like, and prompt messages including the operator's long working alarm, the operator's poor working environment alarm or the like.

The interior electric circuit 301 of the electric welder 300 also comprises a central processing unit and a memory unit. A relational database, reflecting correspondences between the operating parameters of the electric welder and the operating parameters of different types of auto-darkening filters, can be stored/saved in the memory unit. Such a relational database is established depending on experiences of operators who use the welding helmet and/or the electric welder and, when leaving the factory, can be in advance stored/saved in the memory unit of the electric welder 300. Optionally, the database can be periodically updated over a wireless network. For instance, as shown by FIGS. 1 and 3, the interior electric circuit 301 of the electric welder 300 can be coupled to a cloud server 200 via the wireless communication module 100*a*. In this way, the relational database stored/saved in the electric welder 300 can be updated at any time according to demands through the cloud server 200. In the meanwhile, the cloud server 200 is able to directly handle data from the electric welder 300 or handle and analyze data uploaded via the welding helmet 1, and then download the handled data to the electric welder 300 or the welding helmet 1.

Figure 4:
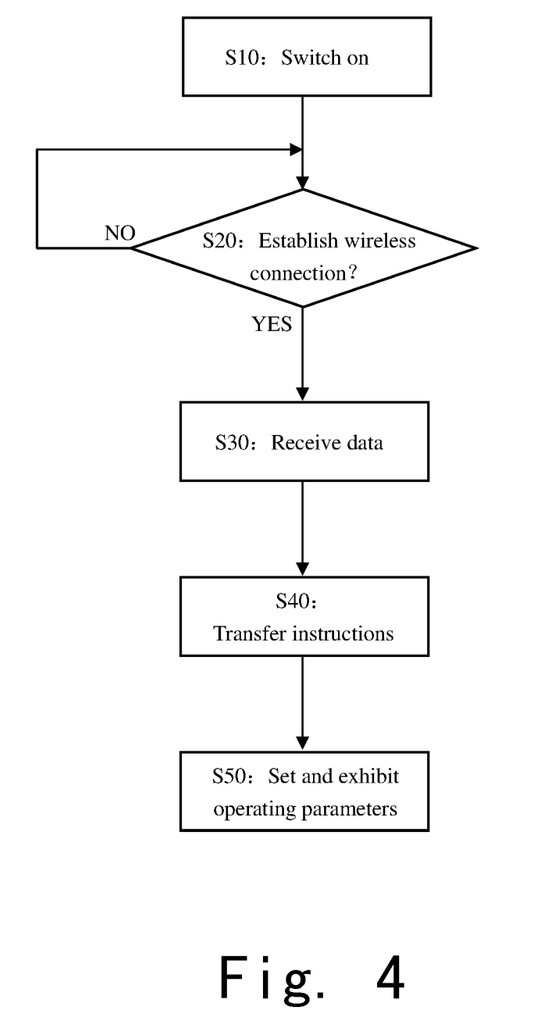
FIG. 4 schematically illustrates a control flowchart for an auto-darkening filter according to an embodiment of the present application.

FIG. 4 schematically illustrates a control flowchart according to an embodiment of the present application, which is used for the auto-darkening filter 20 of the welding helmet 1. At step S10, the operator switches on the auto-darkening filter 20. At step S20, wireless data communication is established between the wireless communication module 100*b* of the auto-darkening filter 20 and the wireless communication module 100*a* of the electric welder 300. At step S30, using the established wireless data communication, the control circuit 700 of the auto-darkening filter 20 is ready to receive information transferring from the interior electric circuit 301 of the electric welder 300. At step S40, depending on the received information, the interior electric circuit 301, based on the relational database and considering the current operating parameter setting of the electric welder 300 (such as the set values of the present welding current, welding type, welding material type, soldering wire size or the like) and the prompt messages (such as the operator's long working alarm, the operator's poor working environment alarm or the like), sends instructions of how to set the operating parameters of the filter to the control circuit 700 of the auto-darkening filter 20. At step S50, based on the received instructions, the control circuit 700 sets the operating parameters of the auto-darkening filter 20 (such as SHADE, SENSITIVITY, DELAY, operating modes or the like), and optionally the already set operating parameters can be exhibited on the display screen 24 for the operator's reference.

After step S50, if the operator has no objection with the already set operating parameters of the auto-darkening filter 20, he/she can begin to carry out a welding operation directly after the welding helmet is worn on his/her head. Otherwise, using the display screen 24, the operating parameters of the auto-darkening filter 20 can be readjusted.

For instance, according to the control flowchart of FIG. 4, in an embodiment that the welding current of the electric welder 300 is selected as DC 50A, the welding type is selected as TIG, the welding material type is selected as carbon steel, and the soldering wire size is selected as 1.6, the control circuit 700 is able to automatically set the SHADE, the SENSITIVITY, the DELAY, and the operating mode of the auto-darkening filter 20 as 9, 7, 5, and WELD respectively after the wireless data communication has been established between the welding helmet and the electric welder 300. In this way, no test welding operation will be required to adjust the operating parameters of the auto-darkening filter 20, and the operator can directly wear the welding helmet 1 on his/her head to carry out his/her work.

Furthermore, in order to ensure the safety of the operator, the relational database stored in the memory unit of the electric welder 300 shall be configured in such a way that it can provide maximum safety redundancy. That is, on the basis of the operators' experiences, the correspondences of the relational database shall be stipulated according to the upper limit of the safety limit range required by the industry or regulations. Moreover, the electric welder 300 can be configured such that it is automatically coupled to the cloud server 200 every time the electric welder is powered on, to ensure that the relational database stored therein can be always updated in the latest state. In another alternative embodiment, the electric welder 300 can be provided with another data interface for example an USB (universal serial bus) interface, such that the relational database can be updated via a portable storage device such as an U-disk or the like.

Although as already explained in the above embodiments the welding helmet 1 is able to establish the wireless data communication with the electric welder 300, it should be understood by the ordinary person that in an alternative embodiment the welding helmet 1 is able to establish wireless data communication with an independent external device different than the electric welder 300. Said independent external device can be installed on an existing electric welder of no wireless networking capability as a retrofitting device for it. The independent external device has the same function as the interior electric circuit 301 of the electric welder 300. Therefore, the control flowchart of FIG. 4 can be achieved by the independent external device receiving the operating parameters of the retrofitted electric welder and, depending on the relational database, sending to the welding helmet 1 instructions of how to set its operating parameters.

In an optional or alternative embodiment, the helmet casing 10 and/or the auto-darkening filter 20 can be installed with a sensor 600, for example an environmental sensor, for acquiring/collecting ambient temperature, humidity, noise, air quality, etc. Therefore, the acquired/collected data and data such as the operator's working duration time can be transferred to an external apparatus for example the electric welder 300 or to the cloud server 200 in wireless data communication with the independent external device. The cloud server 200 is able to analyze the data, after being received, and download the analyzed results to the welding helmet 1 or its control circuit 700. For instance, a relevant prompt message can be downloaded to the welding helmet 1 directly via the cloud server 200 or via the external device, such that the auto-darkening filter 20 is able to give an alarm by means of exhibition of the LCD/LED display screen 24 and/or sound and/or vibration.

In the embodiments of the present application, the auto-darkening filter can be operated independently of the external apparatus such as the electric welder.

Using the technical means of the present application, it will be unnecessary for the operator to carry out a test welding operation to adjust the parameters of the auto-darkening filter for various electric welders. Therefore, welding work time is saved and work efficiency is improved. Furthermore, injuries to a novice operator who does not understand how to correctly set the operating parameters of the electric welder or the auto-darkening filter are avoided. In addition, besides that the operating parameters of the auto-darkening filter 20 can be automatically set before the auto-darkening welding helmet is worn on the operator's head, the central processing unit of the control circuit 700 is able to real-time automatically change the operating parameters of the auto-darkening filter 20, depending on the operating parameters of the electric welder 300, at the time when the auto-darkening welding helmet is being worn on the operator's head.

Moreover, using the technical means of the present application, user management of the welding helmet and apparatus management of the electric welder are integrated into the category of cloud management to improve enterprise management efficiency. In the meanwhile, by collecting and monitoring information on ambient temperature, humidity, noise, air quality at the site where the operator works and the working duration time of the operator, it provides data basis for the optimization and perfection of an enterprise use management system.

Although specific embodiments of the present application are substantively described here, they are given for illustrative purposes only and cannot be deemed to constrain the scope of the present application. Without departing from the spirit and scope of the present application, various replacements, alternations and modifications can be thought out.

The invention claimed is:

1. An auto-darkening welding helmet, comprising:
   a helmet casing;
   an auto-darkening filter secured on the helmet casing and configured to be operated independently of an electric welder;
   a sensor installed on the helmet casing or the auto-darkening filter and configured to collect data including at least one of an ambient temperature, humidity, and air quality;
   a wireless communication circuit installed in the helmet casing and configured to wirelessly communicate data to and from the electric welder and transfer collected data to an external apparatus; and
   a control circuit installed on the helmet casing and configured to adjust, based on data including an operating parameter of the electric welder received from the electric welder and a relational database, an operating parameter for an opaque state of the auto-darkening filter,
   wherein the relational database comprises correspondences between operating parameters of both the electric welder and the auto-darkening filter from previous uses of the electric welder with the auto-darkening filter.

2. The auto-darkening welding helmet of claim 1, further comprising a display screen including an LCD or LED display and configured to exhibit the adjusted operating parameter of the auto-darkening filter and to further allow a present operator to readjust the adjusted operating parameter of the auto-darkening filter.

3. The auto-darkening welding helmet of claim 2, wherein the operating parameter of the electric welder comprises at least one of a welding current, welding type, welding material type, and soldering wire size.

4. The auto-darkening welding helmet as recited in claim 2, wherein the wireless communication circuit comprises a WIFI module, a Bluetooth module, an infrared communication module, a ZigBee module, an 802.15.4 protocol based module, a wireless HART module, or a Z-wave module.

5. The auto-darkening welding helmet of claim 2, wherein the operating parameter of the auto-darkening filter comprises SHADE, SENSITIVITY, DELAY TIME, and WELD MODE.

6. The auto-darkening welding helmet of claim 2, wherein:
   the control circuit is further configured to set, based on data received from the electric welder, a prompt message, and
   the prompt message includes at least one of a working time alarm of an operator or working environment alarm of the operator.

7. The auto-darkening welding helmet of claim 1, wherein the operating parameter of the electric welder comprises at least one of a welding current, welding type, welding material type, and soldering wire size.

8. The auto-darkening welding helmet of claim 1, wherein:
   the wireless communication circuit is further configured to receive results from an analysis of the collected data, and
   the external apparatus is configured to update, via wireless communication, the relational database to comply with safety regulations.

9. The auto-darkening welding helmet of claim 1, wherein the sensor is further configured to collect data including noise.

10. The auto-darkening welding helmet of claim 1, wherein the wireless communication circuit comprises a WIFI module, a Bluetooth module, an infrared communication module, a ZigBee module, an 802.15.4 protocol based module, a wireless HART module, or a Z-wave module.

11. The auto-darkening welding helmet of claim 1, wherein the operating parameter of the auto-darkening filter comprises SHADE, SENSITIVITY, DELAY TIME, and WELD MODE.

12. The auto-darkening welding helmet of claim 1, wherein:
   the control circuit is further configured to set, based on data received from the electric welder, a prompt message, and
   the prompt message includes at least one of a working time alarm of an operator or working environment alarm of the operator.

13. A welding apparatus, comprising:
   an electric welder including a first wireless communication circuit;
   a welding torch connected to the electric welder via a cable;
   a gas cylinder connected to the electric welder via a pipeline; and
   an auto-darkening welding helmet comprising:
      a helmet casing,
      an auto-darkening filter secured on the helmet casing,
      a sensor installed on the helmet casing or the auto-darkening filter and configured to collect data including at least one of an ambient temperature, humidity, and air quality,
      a second wireless communication circuit installed in the helmet casing and configured to wirelessly communicate with the electric welder, and
      a control circuit installed on the helmet casing and configured to adjust, based on data including an operating parameter of the electric welder received from the electric welder and a relational database, an operating parameter for an opaque state of the auto-darkening filter,
   wherein the second wireless communication circuit is configured to wirelessly communicate data to and from the first wireless communication circuit, and
   wherein the relational database comprises correspondences between operating parameters of both the electric welder and the auto-darkening filter from previous uses of the electric welder with the auto-darkening filter.

14. The welding apparatus of claim 13, wherein the welding apparatus comprises a memory unit including the relational database.

15. The welding apparatus of claim 14, wherein:
the welding apparatus is configured to send data, based on currently set operating parameters of the electric welder, to the auto-darkening welding helmet, and
the auto-darkening filter is configured to automatically set the operating parameters based on the received data from the electric welder.

16. The welding apparatus of claim 15, wherein:
the first wireless communication circuit is configured to be coupled to a cloud server over a wireless network, and
the first wireless communication circuit is configured to update the relational database over the wireless network.

17. The welding apparatus of claim 14, wherein:
the first wireless communication circuit is configured to be coupled to a cloud server over a wireless network, and
the first wireless communication circuit is configured to update the relational database by using the wireless network.

18. The welding apparatus of claim 17, wherein the relational database is updated to comply with safety regulations.

19. The welding apparatus of claim 13, wherein the first wireless communication circuit is coupled to a cloud server over a wireless network and configured to at least one of (i) upload ambient data and operating parameters from the second wireless communication circuit to the cloud server or (ii) transfer data from the cloud server to the second wireless communication circuit.

20. The welding apparatus of claim 19, wherein:
the control circuit is further configured to set, based on data received from the electric welder, a prompt message, and
the welding apparatus is configured to transfer the prompt message from the cloud server to the auto-darkening welding helmet,
based on the prompt message, the auto-darkening filter is configured to display an alarm by exhibition on at least one of a display screen of the auto-darkening filter, a sound, or a vibration,
wherein the display screen comprises an LCD or LED display.

* * * * *